(12) United States Patent
Cress

(10) Patent No.: US 11,569,640 B2
(45) Date of Patent: Jan. 31, 2023

(54) SPARK PLUG

(71) Applicant: Caterpillar Inc., Peoria, IL (US)

(72) Inventor: James Jay Cress, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/679,922

(22) Filed: Feb. 24, 2022

(65) Prior Publication Data

US 2022/0416517 A1 Dec. 29, 2022

Related U.S. Application Data

(63) Continuation-in-part of application No. 17/304,637, filed on Jun. 23, 2021.

(51) Int. Cl.
| | |
|---|---|
| *H01T 13/20* | (2006.01) |
| *H01T 13/46* | (2006.01) |
| *H01T 21/02* | (2006.01) |
| *H01T 13/54* | (2006.01) |

(52) U.S. Cl.
CPC .......... *H01T 13/462* (2013.01); *H01T 13/54* (2013.01); *H01T 21/02* (2013.01)

(58) Field of Classification Search
CPC ............................ H01T 13/54; H01T 13/467
USPC ........................................................ 313/141
See application file for complete search history.

(56) References Cited

U.S. PATENT DOCUMENTS

| | | | |
|---|---|---|---|
| 2,900,547 A | 8/1959 | Engel | |
| 9,225,151 B2 | 12/2015 | Douglas et al. | |
| 9,859,688 B1 | 1/2018 | Gerstner | |
| 10,938,187 B1 | 3/2021 | Cress | |
| 2016/0254650 A1* | 9/2016 | Maul | H01T 13/54 |
| | | | 123/169 EL |
| 2017/0145898 A1* | 5/2017 | Schäfer | F02P 13/00 |

(Continued)

FOREIGN PATENT DOCUMENTS

| | | |
|---|---|---|
| EP | 0675272 B1 | 8/1997 |
| EP | 2413442 B1 | 10/2016 |
| EP | 3118952 B1 | 3/2021 |

(Continued)

OTHER PUBLICATIONS

Written Opinion and International Search Report for Int'l. Patent Appln. No PCT/US2022/032435, dated Sep. 16, 2022 (17 pgs).

*Primary Examiner* — Christopher M Raabe
(74) *Attorney, Agent, or Firm* — Brannon Sowers & Cracraft PC

(57) ABSTRACT

A spark plug includes a central electrode member and an outer electrode member. The central electrode member includes a central base and a plurality of electrode prongs extending in an axial direction from the central base. The outer electrode member surrounds the central electrode member. The outer electrode member includes a wall that is radially spaced from the plurality of electrode prongs to allow a series of electric arcs to form between the wall and the plurality of electrode prongs. The outer electrode member and the central electrode member are sized and positioned relative to one another such that a first rate of wear of the outer electrode member, along a longitudinal axis of the spark plug, is substantially equal to a second rate of wear of the central electrode member along the longitudinal axis.

27 Claims, 5 Drawing Sheets

(56) References Cited

U.S. PATENT DOCUMENTS

2019/0376441 A1* 12/2019 Brubaker ................ F02P 13/00

FOREIGN PATENT DOCUMENTS

| GB | 2327459 A | 1/1999 |
| GB | 2325492 B | 2/2000 |
| JP | 06140124 A | 5/1994 |
| WO | 2014043657 A2 | 3/2014 |
| WO | 2018213264 A2 | 11/2018 |

* cited by examiner

SPARK PLUG

CROSS-REFERENCE TO RELATED APPLICATIONS

This application is a continuation-in-part of U.S. patent application Ser. No. 17/304,637 titled "SPARK PLUG," filed Jun. 23, 2021, the entire disclosure of which is expressly incorporated by reference herein.

TECHNICAL FIELD

The present disclosure relates generally to a spark plug and, for example, to a spark plug for a spark-ignition (SI) engine.

BACKGROUND

An internal combustion engine powers a machine by converting chemical energy stored in fuel (e.g., gasoline, compressed natural gas (CNG), methanol, ethanol, bioethanol, or another type of fuel) into mechanical work. In such an engine, air is mixed with the fuel to form an air-fuel mixture. Some engines utilize a spark plug, which typically includes a central electrode and one or more outer electrodes. The spark plug may transmit an electric current along the central electrode into a chamber that is fluidly connected to or inside of a cylinder. A piston is movably mounted within the cylinder to travel in a cycle between a top dead center (TDC) position and a bottom dead center (BDC) position. In some embodiments, as the piston reaches the TDC position, a spark resulting from the electric current jumps a gap between the central electrode and the one or more outer electrodes, causing the air-fuel mixture to combust. A force of the combustion drives the piston down towards the BDC position, and the cycle repeats. Because the piston is connected to a drivetrain of the machine, continued movement of the piston propels and/or powers the machine.

While gaseous fuel (e.g., CNG, methanol, ethanol, bioethanol, and/or the like) is known to provide a relatively low power density, such fuel is also known to emit relatively low emissions. Thus, manufacturers have sought to produce engines that efficiently utilize such fuel. For example, to compensate for the relatively low power density provided by natural gas, manufacturers have developed CNG engines that operate under high compression ratios. Because of the high compression ratios, however, the combustion of the air-fuel mixture exposes certain engine components, such as a spark plug, to high temperatures and/or significant stress. As a result, the spark plug may be susceptible to premature wear, which may lead to increased costs associated with repair, replacement, and/or machine downtime. Furthermore, in some cases, the electrodes may wear unevenly, leading to a widening of a spark gap between the electrodes which prevents the electric current from bridging the spark gap. In such a case, in addition to the above-described costs, valuable material may also be wasted.

U.S. Pat. No. 10,145,292 discloses a spark plug including a pre-chamber for an engine. The spark plug includes a first cylindrical structure having a wall defining a bore. An electrode is positioned inside the bore such that the electrode is spaced apart from the wall to define at least one electrode spark gap. The spark plug further includes a second cylindrical structure configured to receive the first cylindrical structure. The second cylindrical structure has one or more access apertures configured to facilitate access to the wall of the first cylindrical structure.

The spark plug of the present disclosure solves one or more of the problems set forth above and/or other problems in the art.

SUMMARY

In some implementations, a spark plug includes a central electrode member that includes a base and a plurality of electrode prongs extending from the base, wherein the base is substantially centered on a longitudinal axis that extends through a geometric center of a first reference circle and a second reference circle, wherein the first reference circle has a first diameter, and the second reference circle has a second diameter that is greater than the first diameter by a gap length, an electrode prong, of the plurality of electrode prongs, includes an axial portion and a radial portion, wherein the axial portion includes an outer surface that partially defines the first reference circle, wherein the axial portion extends in an axial direction that is substantially parallel to the longitudinal axis, and axial portion has a width along a circumferential direction of the first reference circle and a thickness along a radial direction that is perpendicular to the axial direction, and the radial portion connects the axial portion to the base; and an outer electrode member that includes an interior surface that defines the second reference circle, and wherein $$P = \frac{w^2 \sqrt{l}}{t^{2.5}}$$

where P is a parameter having a value in a range of approximately 1.5 to approximately 7.5, w is the width in millimeters, l is the gap length in millimeters, and t is the thickness in millimeters.

In some implementations, a spark plug includes a central electrode member that includes: a central base, and six electrode prongs extending radially and axially from the central base; and an outer electrode member that is concentric with and surrounds the central electrode member, wherein the outer electrode member includes a wall that is radially spaced from the six electrode prongs to allow a series of electric arcs to form between the wall and the six electrode prongs; wherein the outer electrode member and the central electrode member are sized and positioned relative to one another such that a first rate of wear of the outer electrode member, along a longitudinal axis of the spark plug, is substantially equal to a second rate of wear of the central electrode member along the longitudinal axis.

In some implementations, a method includes activating a power system that includes a spark plug attached to a cylinder, the spark plug including: a central electrode member extending an initial length along a longitudinal axis, and an outer electrode member that is concentric with and surrounds the central electrode member, wherein the outer electrode member includes a wall that is radially spaced from the central electrode member to define a gap between the wall and the central electrode member; transmitting a pulse of electric current along the central electrode member to generate a spark in the gap between the central electrode member and the outer electrode member, wherein the spark causes an air-fuel mixture to combust within the cylinder, the central electrode member to shorten from the initial length along the longitudinal axis, and a concavity to develop in the wall of the outer electrode member; and repeating the transmitting until the central electrode member has shortened from the initial length by at least 1.5 millimeters to a reduced length.

In some implementations, a spark plug includes a housing defining a longitudinal axis, a first electrode having an electrode surface extending circumferentially around the longitudinal axis, and a second electrode including an electrode prong spaced from the electrode surface to form a spark gap between the first electrode and the second electrode. The electrode prong has a thickness t in a radial direction, a width w in a circumferential direction, and is spaced from the electrode surface a gap length l of the spark gap in a radial direction. Further, t, w, and l together define a parameter P having a value according to the equation $$P = \frac{w^2 \sqrt{l_1}}{t^{2.5}}$$

from approximately 1.5 to approximately 7.5.

In some implementations, a prechamber spark plug includes a housing having formed therein a combustion prechamber and a flow passage from the combustion prechamber. The spark plug further includes a first electrode, and a second electrode having a plurality of electrode prongs. A plurality of spark gaps are defined between each one of the plurality of electrode prongs and the first electrode. Each of the plurality of electrode prongs has a thickness t and a width w and is spaced from the first electrode a gap length at a respective one of the plurality of spark gaps. Further, t, w, and l together define a parameter P according to the equation $$P = \frac{w^2 \sqrt{l_1}}{t^{2.5}}$$

having a value from approximately 1.5 to approximately 7.5.

In some implementations, a spark electrode assembly includes a first electrode having an electrode surface extending circumferentially around a longitudinal axis, and a second electrode including an electrode prong supported at a fixed location relative to the electrode surface. A spark gap is formed between the electrode surface and the electrode prong. The electrode prong has a size defined by a thickness t and a width w, and is positioned at a gap length l of the spark gap from the electrode surface that is based on a direct exponential relation to t and an inverse exponential relation tow, such that axial wear rates of the electrode surface and the electrode prong are substantially equal.

In some implementations, a method of making a spark plug includes placing a first electrode and a second electrode at a fixed position and orientation relative to one another, and forming, by way of the placing a first electrode and a second electrode, a spark gap between an electrode surface of the first electrode extending circumferentially around a longitudinal axis and an electrode prong of the second electrode. The method further includes establishing, by way of the forming a spark gap, a gap length of the spark gap in inverse relation to a width of the electrode prong, and in direct relation to a thickness of the electrode prong.

DETAILED DESCRIPTION

This disclosure relates to a spark plug, which is applicable to spark-ignition (SI) engines (e.g., a compressed natural gas (CNG)-powered engine, a methanol-powered engine, an ethanol-powered engine, a bioethanol-powered engine, a gasoline-powered engine, a gaseous hydrogen-powered engine, or another type of SI engine employing any of a variety of liquid fuels or gaseous fuels including blends) and/or systems including SI engines. Such engines and/or engine systems may be implemented in a machine, such as a generator, a movable machine (e.g., a motor vehicle, a railed vehicle, a watercraft, an aircraft), or another type of machine.

To simplify the explanation below, the same reference numbers may be used to denote like features. The drawings may not be to scale.

Figure 1:
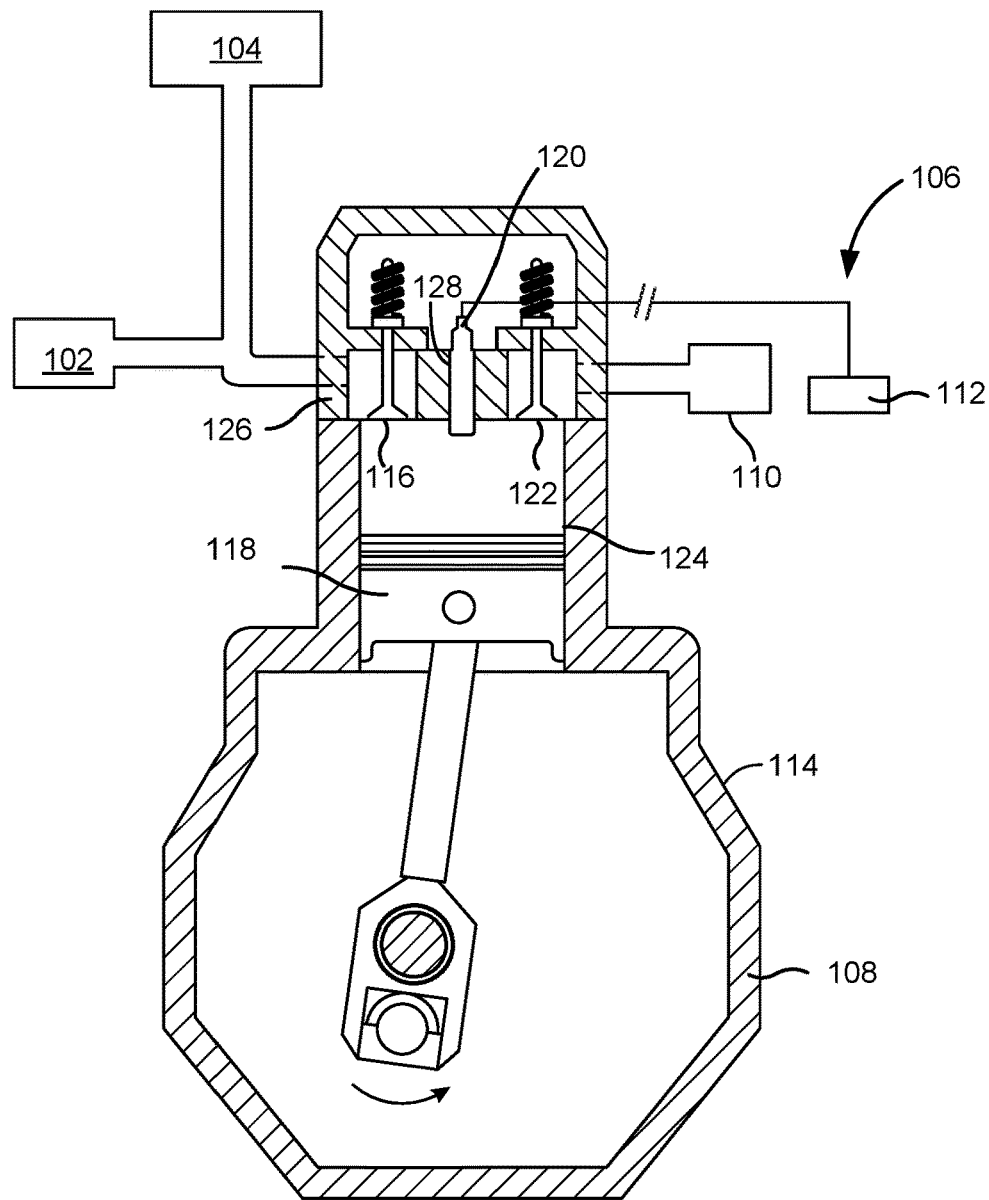
FIG. 1 is a diagram of an example power system.
Figure 2:
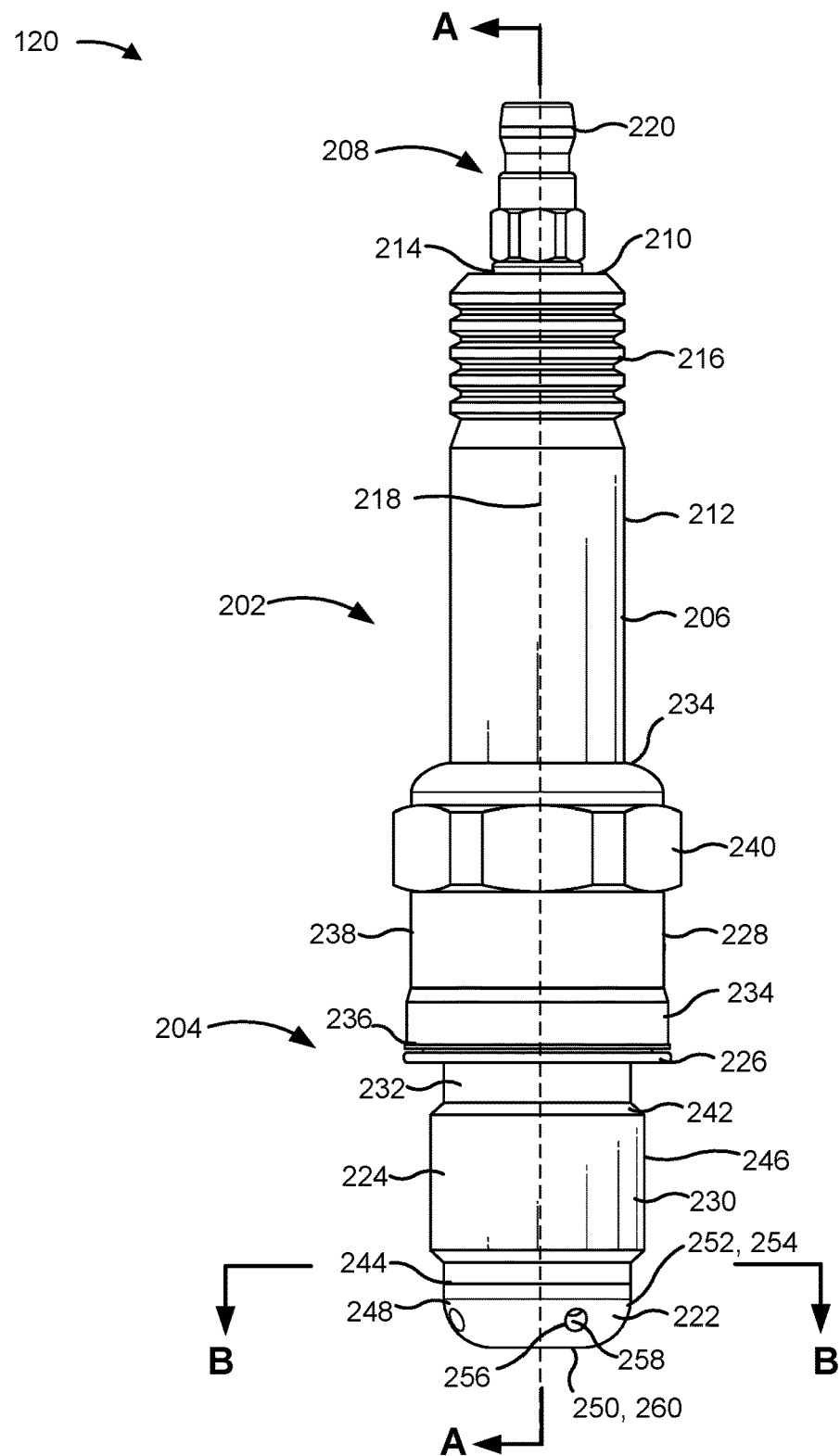
FIG. 2 is a side view of an example spark plug of the engine system.

FIG. 1 depicts a power system 100. The power system 100 includes an air inlet 102, a fuel tank 104, an ignition system 106, an engine 108, and an exhaust system 110. The air inlet 102 is a structure that is configured to receive and route air toward the engine 108. The fuel tank 104 is a structure that is configured to receive and distribute fuel (e.g., CNG, methanol, ethanol, bioethanol, gasoline, or another type of fuel) toward the engine 108 to mix with the air to form an air-fuel mixture. The ignition system 106 is a system that is configured to initiate a combustion of the air-fuel mixture in the engine 108. The ignition system 106 includes an electrical energy source 112, such as an ignition coil, that is electrically coupled to the engine 108. In some implementations, the ignition system 106 may further include one or more other electrical devices that are configured to control and/or communicate with the engine 108, such as an electronic control unit.

The engine 108 is a device that is configured to convert chemical energy stored in the fuel into mechanical work (e.g., by driving a crankshaft). The engine 108 includes an engine block 114, at least one inlet valve 116, a piston 118, a spark plug 120, and at least one outlet valve 122. The engine block 114, which includes at least one cylinder 124 and a cylinder head 126, houses the inlet valve 116, the piston 118, the spark plug 120, and the at least one outlet valve 122. The at least one inlet valve 116 is a mechanism that is configured to selectively permit the air-fuel mixture to enter the cylinder 124, which drives the piston 118 downward toward a bottom dead center (BDC) position. The piston 118 is a device that is movable within the cylinder 124 in a continuous cycle between the BDC position and a top dead center (TDC) position to propel and/or power a machine. During such movement, the piston 118 compresses the air-fuel mixture. The spark plug 120, which is mounted to a bore 128 within the cylinder head 126 above the cylinder 124, is a device that is configured to transmit an electric current from the electrical energy source 112 to cause the compressed air-fuel mixture to combust. A force of the combustion drives the piston 118 back down toward the BDC position. The at least one outlet valve 122 is a mechanism that is configured to selectively permit exhaust gas, resulting from combustion, to be expelled from the cylinder 124 as the piston 118 moves back to the TDC position.

The exhaust system 110 is a system, positioned downstream of the engine 108, that is configured to reduce or remove emission compounds (e.g., nitrous oxides (NOx), particulate matter, and/or hydrocarbons) from the exhaust gas to satisfy emission standards. For example, the exhaust system 110 may include a diesel particulate filter (DPF) (e.g., to treat the particulate matter), a selective catalytic reduction (SCR) module (e.g., to treat the NOx), and/or a diesel oxidation catalyst (DOC) (e.g., to treat the hydrocarbons).

As indicated above, FIG. 1 is provided as an example. Other examples may differ from what is described with regard to FIG. 1. For example, the number and arrangement of components (e.g., the air inlet 102, the fuel tank 104, the ignition system 106, the engine 108, and/or the exhaust system 110) may differ from that shown in FIG. 1. Thus, there may be additional components, fewer components, different components, differently shaped components, differently sized components, and/or differently arranged components than those shown in FIG. 1.

Figure 3:
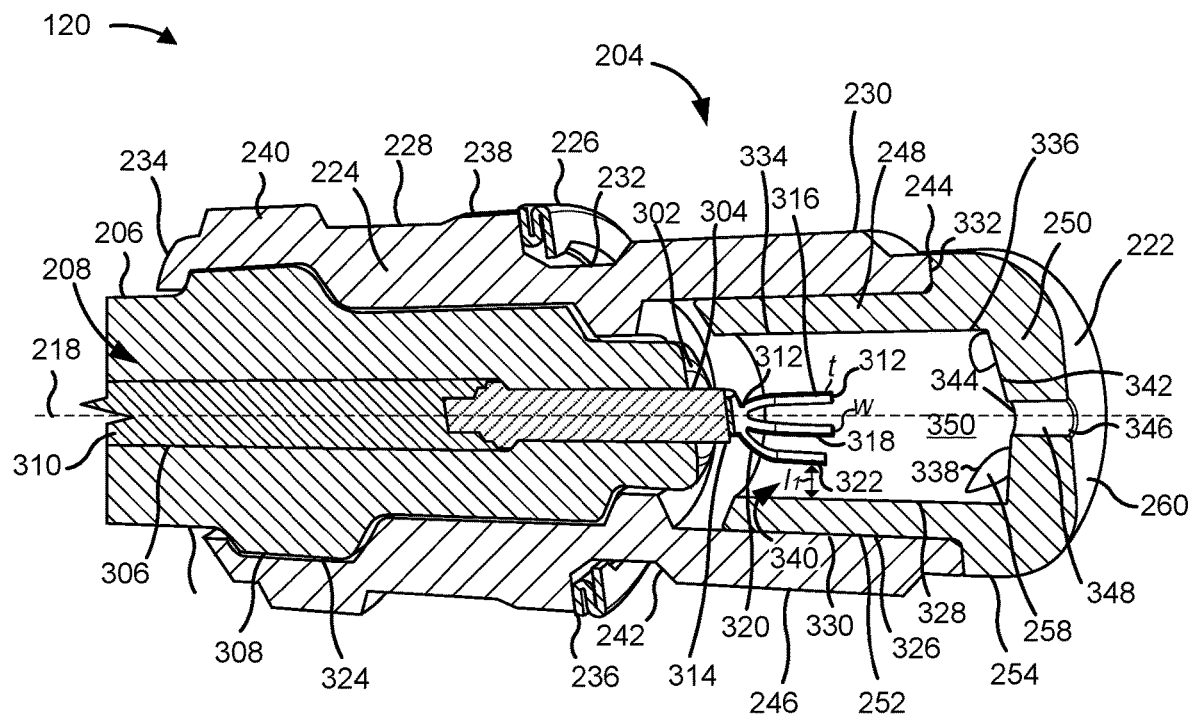
FIG. 3 is a cross-sectional view of the spark plug in an initial state, taken along lines A-A of FIG. 2.
Figure 4:
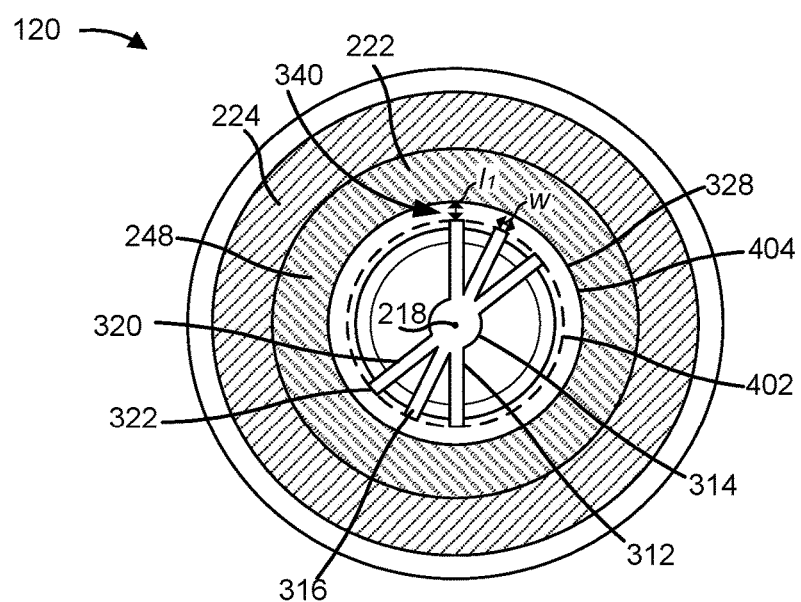
FIG. 4 is a cross-sectional view of the spark plug in the initial state, taken along lines B-B of FIG. 2.
Figure 5:
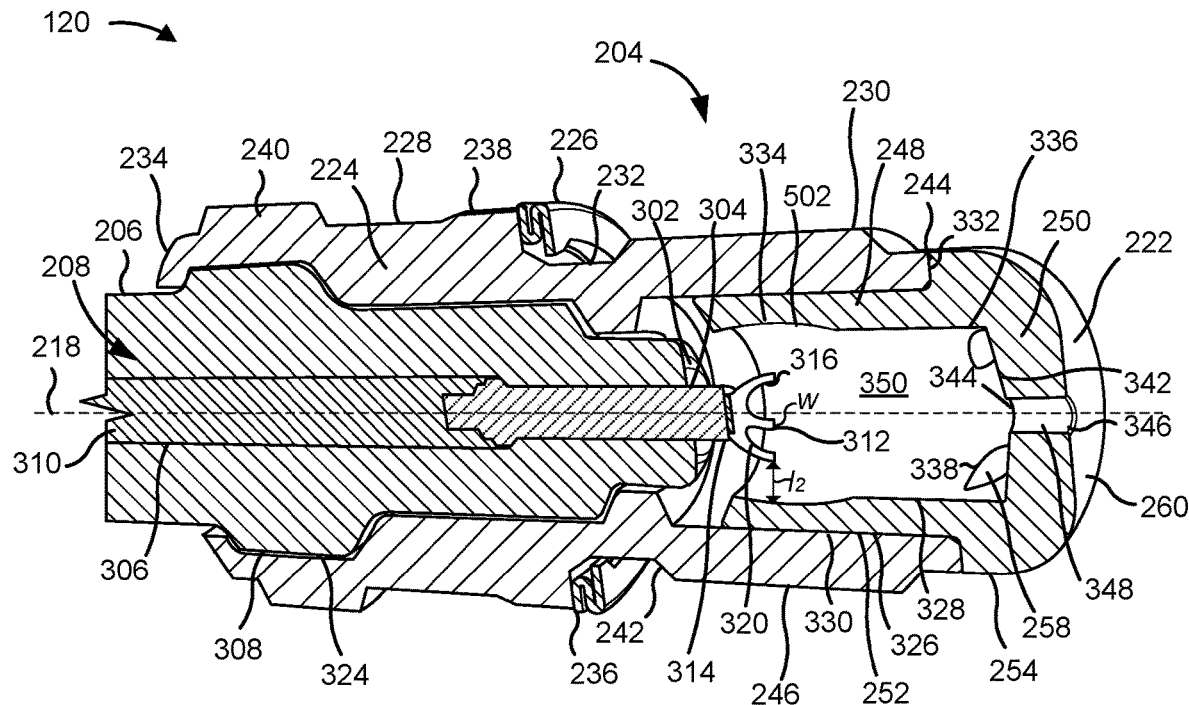
FIG. 5 is a cross-sectional view of the spark plug in a final state, taken along lines A-A of FIG. 2.
Figure 6:
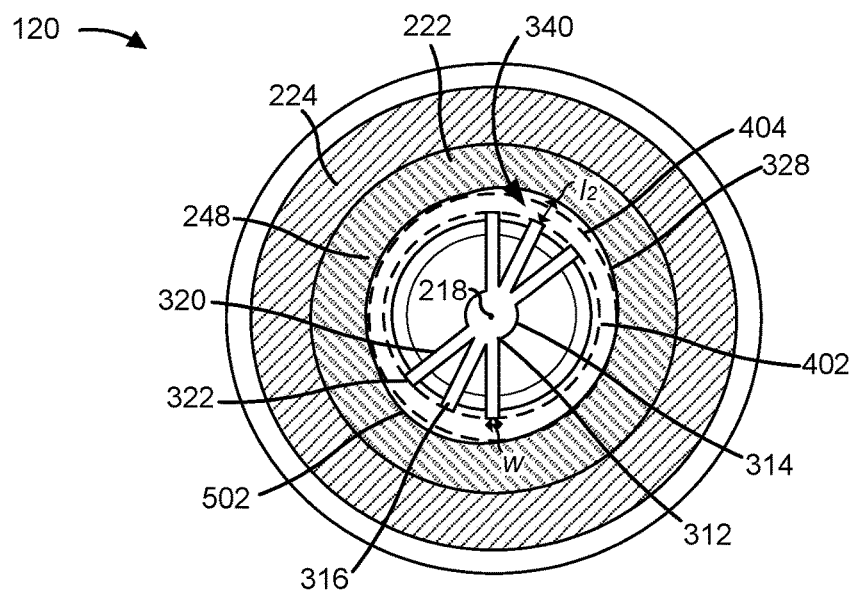
FIG. 6 is a cross-sectional view of the spark plug in the final state, taken along lines B-B of FIG. 2.

FIGS. 2-6 depict the spark plug 120. The spark plug 120 may include a prechamber spark plug as further discussed herein. As will also be explained below, FIGS. 3-6 depict internal components of the spark plug 120 in different states of wear. In particular, FIGS. 3-4 depict the internal components of the spark plug 120 in an initial (e.g., unworn) state. FIGS. 5-6 depict the internal components of the spark plug 120 in a final (e.g., substantially worn) state.

The spark plug 120 includes a body 202 and a nozzle assembly 204 secured thereto. The body 202 includes an insulator 206 and a central conductor 208. The insulator 206, which may be made of ceramic or another type of electrically-insulating material, is configured to electrically isolate the central conductor 208 and maintain structural integrity of the spark plug 120 in a high temperature environment. The insulator 206 includes an upper end surface 210, a lower end surface 302, and an exterior surface 212 that connects the upper end surface 210 to the lower end surface 302. The upper end surface 210 includes an upper opening 214, and the lower end surface 302 includes a lower opening 304 that communicates with the upper opening 214 to define a through hole 306. The exterior surface 212, which may be substantially cylindrical in shape, includes a plurality of annular ribs 216 and a flange 308. The plurality of annular ribs 216 are arranged at a location proximate to the upper end surface 210 and are configured to mitigate grounding of the electric current traveling through the spark plug 120. The flange 308, which is arranged at a location proximate to the lower end surface 302, is shaped and sized to facilitate attachment of the insulator 206 to the nozzle assembly 204.

The central conductor 208 is a series of electrical conductors which are sequentially arranged along a longitudinal axis 218 of the spark plug 120 and are together electrically connected to transmit the electric current from the electric energy source 112 into the nozzle assembly 204. The series of electrical conductors include a terminal connector 220, a terminal pin 310, and a central electrode member 312. The terminal connector 220 is a conductive component that is mounted to the upper end surface 210 of the insulator 206 and is configured to be connected to a wire extending from the electrical energy source 112. The terminal connector 220 may be, for example, made of a nickel alloy. The terminal pin 310 is an elongated conductive element that is received in and extends along the through hole 306 of the insulator 206 to connect the terminal connector 220 to the central electrode member 312. The terminal pin 310 may be, for example, made of steel.

The central electrode member 312 is a conductive component that is sized and arranged to interact with an outer electrode member 222 (described below) to generate an electric arc or spark within the nozzle assembly 204 to cause the air-fuel mixture to combust within the cylinder 124. The central electrode member 312, which may be made of a material such as an iridium alloy or a platinum alloy, includes a central base 314 and a plurality of electrode prongs 316 extending therefrom. The central base 314 is secured within the through hole 306 and protrudes from the lower opening 301 of the insulator 206. As shown in FIG. 4, the central base 314 is substantially centered on the longitudinal axis 218, which extends through a geometric center of a first reference circle 402. The plurality of electrode prongs 316, which may be substantially identical to one another, may include six electrode prongs, five electrode prongs, four electrode prongs, or another quantity of electrode prongs. Other arrangements of the plurality of electrode prongs 316 are contemplated. For example, the plurality of electrode prongs 316 may form an equiangular arrangement.

Each of the plurality of electrode prongs 316 (hereinafter referred to as the electrode prong 316) includes an axial portion 318 and a radial portion 320 that connects the axial portion 318 to the central base 314. The axial portion 318 extends in an axial direction and includes an outer surface 322 that defines a width w of the electrode prong 316 and partially defines the first reference circle 402. In other words, the outer surfaces 322 of the axial portions 318 lie on the first reference circle 402. The axial direction is substantially parallel to the longitudinal axis 218. The radial portion 320 extends in a radial direction that is substantially perpendicular to the longitudinal axis 218. In some implementations, at least a portion of the radial portion 320 may be curved and thus extend at an acute angle relative to the radial direction. As will be described below, the electrode prong 316 is sized and positioned, relative to the nozzle assembly 204, in such a way that extends a service life of the spark plug 120. For reference, the electrode prong 316 further includes a thickness t that is substantially perpendicular to the width w.

The nozzle assembly 204 includes a housing 224, a gasket 226, and an outer electrode member 222. The housing 224, which may be made of carbon steel, is configured to be secured to the exterior surface 212 of the insulator 206. The housing 224 includes a first protruding segment 228, a second protruding segment 230, and a connection segment 232 therebetween. The first protruding segment 228 includes a first upper surface 234, a first lower surface 236, a first outer surface 238, and a first inner surface 330. The first upper surface 234 is opposite to the first lower surface 236. The first outer surface 238, which is opposite to the first inner surface 324, includes an engagement portion 240 that is configured to be engaged by a tool or otherwise engaged to facilitate attachment of the spark plug 120 to the cylinder head 126. For example, the engagement portion 240 may include a hex protrusion that is configured to be rotated by a wrench. The first inner surface 324 is configured to be secured to the flange 308 of the insulator 206.

The second protruding segment 230 includes a second upper surface 242, a second lower surface 244, a second outer surface 246, and a second inner surface 326. The second upper surface 242 faces the first lower surface 236 and is opposite to the second lower surface 244. The second outer surface 246 includes external threads to facilitate threadably attaching the spark plug 120 to the bore 128 within the cylinder head 126 to position the outer electrode member 222 within the cylinder 124. The connection segment 232 is sized to improve sealing of the bore 128. For example, the connection segment 232 may have a relatively increased length in a range of approximately 5 millimeters (mm) to approximately 6 mm.

The gasket 226 is an annular sealing component that is configured to be secured to the first lower surface 236 of the housing 224 to seal the bore 128 of the cylinder head 126. To resist creep, the gasket 226 may be made of INCONEL® or a similar type of material. In other words, the gasket 226 may be configured to mitigate the potential of deformation due to exposure to mechanical stresses associated with the combustion process.

The outer electrode member 222 is a conductive component that is configured to interact with the central electrode member 312 to generate the electric arc therebetween. When attached to the housing 224 of the spark plug 120, as described below, the outer electrode member 222 is concentric with and surrounds the central electrode member 312. The outer electrode member 222, which may be made of a nickel alloy, a platinum alloy, or an iridium alloy, includes a side wall 248 and a bottom wall 250. The side wall 248 includes an exterior surface 252 and an interior surface 328 that is opposite to the exterior surface 252. The exterior surface 252 includes a first exterior axial portion 330, a second exterior axial portion 254, and a radial portion 332 extending therebetween. The first exterior axial portion 330 is configured to be attached (e.g., via welding, soldering, and/or the like) to the second inner surface 326 of the housing 224. The second exterior axial portion 254, which has a diameter that is substantially equal to a diameter of the second outer surface 246 of the housing 224, includes a plurality of exterior openings 256. The radial portion 332 is configured to be attached (e.g., via welding, soldering, and/or the like) to the second lower surface 244 of the housing 224.

The interior surface 328 of the outer electrode member 222 is configured to be radially spaced from the outer surfaces 322 of the axial portions 318 of the plurality of electrode prongs 316. The interior surface 328 includes a first interior axial portion 334 and a second interior axial portion 336, which may be substantially cylindrical in the initial state of the spark plug 120. The first interior axial portion 334 is opposite to the first exterior axial portion 330 of the side wall 248. The second interior axial portion 336, which is opposite to the second exterior axial portion 332 and of side wall 248, includes a plurality of interior openings 338 that fluidly communicate with the plurality of exterior openings 256 to define a respective plurality of side wall flow passages 258.

When the spark plus 120 is in the initial state, the interior surface 328 of the outer electrode member 222 defines a second reference circle 404. In other words, when the spark plug 120 is unworn, both the first interior axial portion 334 and the second interior axial portion 336 lie on the second reference circle 404. The second reference circle 404 has a diameter that is greater than a diameter of the first reference circle 402 by an initial length $l_1$ of a gap 340, across which the electric current extends to form the electric arc.

The bottom wall 250 of the includes an upper surface 342, which has an upper opening 344, and a lower surface 260, which has a lower opening 346. The lower opening 346 fluidly communicates with the upper opening 344 to define a bottom wall flow passage 348. Together with the plurality of side wall flow passages 258, the bottom wall flow passage 348 is configured to permit the air-fuel mixture to flow into a combustion prechamber or "pre-combustion chamber" 350 formed by a combination of the insulator 206, the housing 224, and the outer electrode member 222.

As implemented within the power system 100, the spark plug 120 has a limited service life due to erosion of the central electrode member 312 and the outer electrode member 222. Based on activating the power system 100, the air-fuel mixture may flow into the pre-combustion chamber 350 through the plurality of side wall flow passages 258 and the bottom wall flow passage 348 as the piston 118 travels upward toward the TDC position to compress the air-fuel mixture. The electrical energy source 112 transmits a pulse of electric current, which travels along the central conductor 208 and enters the pre-combustion chamber 350 as the piston 118 approaches a desired position. Because the voltage of the electric current exceeds a dielectric strength of the air-fuel mixture, the electric current bridges the gap 340 between the central electrode member 312 and the outer electrode member 222. With the air-fuel mixture ionized by the electric current, a spark is generated to ignite an ignition charge of fuel and air in the pre-combustion chamber 350 that triggers ignition of a main charge of fuel and air within the cylinder 124. As the engine 108 continues to operate, the spark plug 120 will continue to generate sparks between the central electrode member 312 and the outer electrode member 222, which exposes the central electrode member 312 and the outer electrode member 222 to extreme temperatures and pressures within pre-combustion chamber 350. Due at least in part to such exposure, the plurality of electrode prongs 316 of the central electrode member 312 experience particle ejection and surface oxidation, which causes the plurality of electrode prongs 316 to gradually shorten along the longitudinal axis 218 until reaching the final state shown in FIGS. 5-6. At the same time, the first interior axial portion 334 of the interior surface 328 likewise experiences particle ejection and surface oxidation, which causes a concavity 502 to develop in the interior axial portion 334 and thus increases a length of the gap 340. As the plurality of electrode prongs 316 shorten, the concavity 502 correspondingly elongates along the longitudinal axis 218 until likewise reaching the final state. When the spark plug 120 is in the final state, which marks an end of the service life of the spark plug 120, the pulses of electric current are no longer able to bridge the gap 340, which has increased in size from the initial length $l_1$ (shown in FIGS. 3-4) to a final length $l_2$ (as shown in FIGS. 5-6). In the final state, the plurality of electrode prongs 316 may have a reduced length that is less than an initial length of the plurality of electrode prongs 316 by at least 1.5 mm.

In order to function as described above, the central electrode member 312 and the outer electrode member 222 are sized and positioned relative to one another such that a rate of shortening or "wear rate" of the plurality of electrode prongs 316 is substantially equal to a rate of elongation of the concavity 502. In other words, based on the series of electric arcs extending through the air-fuel mixture within the pre-combustion chamber 350, the central electrode member 312 and the outer electrode member 222 are configured to wear at a substantially uniform rate along the longitudinal axis 218. To achieve this substantially uniform rate of wear, the central electrode member 312 and the outer electrode member 222 are sized and arranged such that there is an inverse relationship between the width w of the electrode prong 316 and the initial length $l_1$ of the gap 340. In some implementations, such a relationship may be represented by the Equation 1:

$$P = \frac{w^2 \sqrt{l_1}}{t^{2.5}}$$

where P is a parameter having a value in a range of approximately 1.5 to approximately 7.5, w is the width of an electrode prong 316 in mm, $l_1$ is the initial length of the gap 340 in mm, and t is the thickness of the electrode prong 316 in mm. In some implementations, the value of the parameter P may be in a range of approximately 2.25 to approximately 2.75. In some implementations, the value of the parameter P may be in a range of approximately 4.5 to approximately 5.5. Other values are herein contemplated.

As indicated above, FIGS. 2-6 are provided as an example. Other examples may differ from what is described with regard to FIGS. 2-6. For example, the number and arrangement of components may differ from that shown in FIGS. 2-6. Thus, there may be additional components, fewer components, different components, differently shaped components, differently sized components, and/or differently arranged components than those shown in FIGS. 2-6. For example, the outer electrode member 222 may include a different arrangement and/or quantity of flow passages (e.g., one flow passage, two flow passages, or another quantity).

Figure 7:
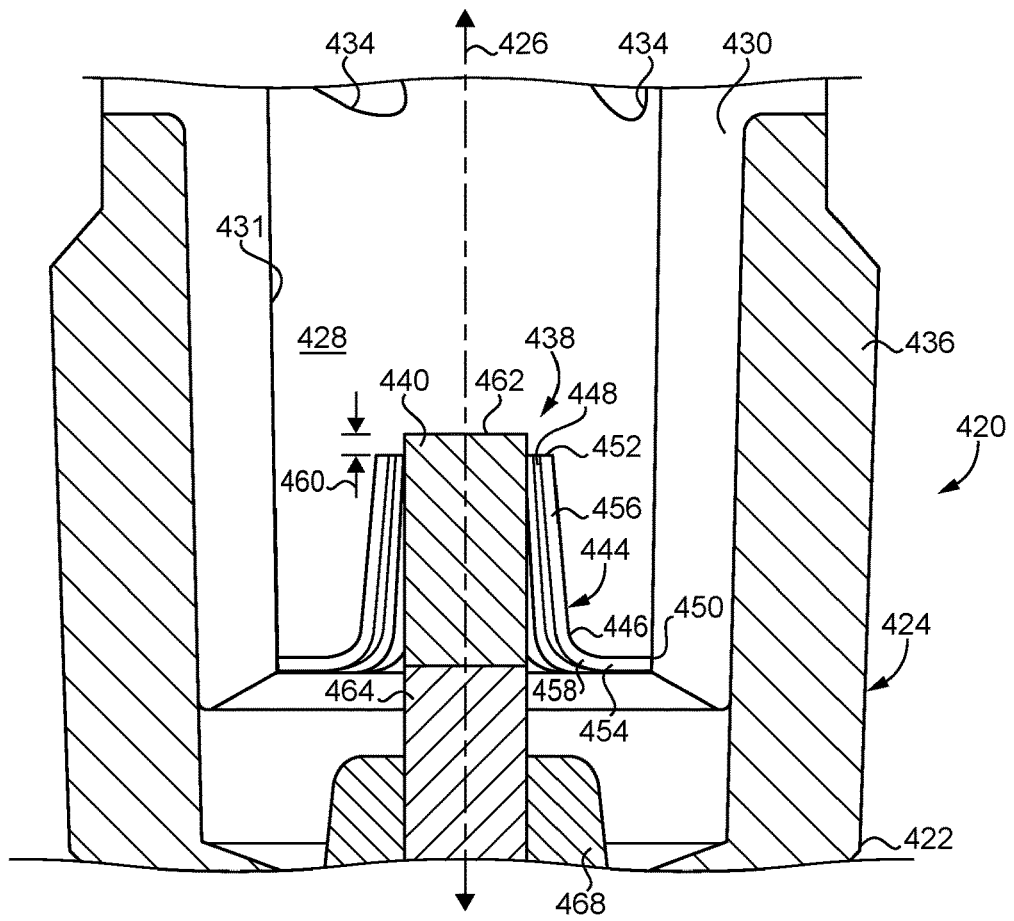
FIG. 7 is a cross-sectional view of a part of a spark plug, according to another embodiment.
Figure 8:
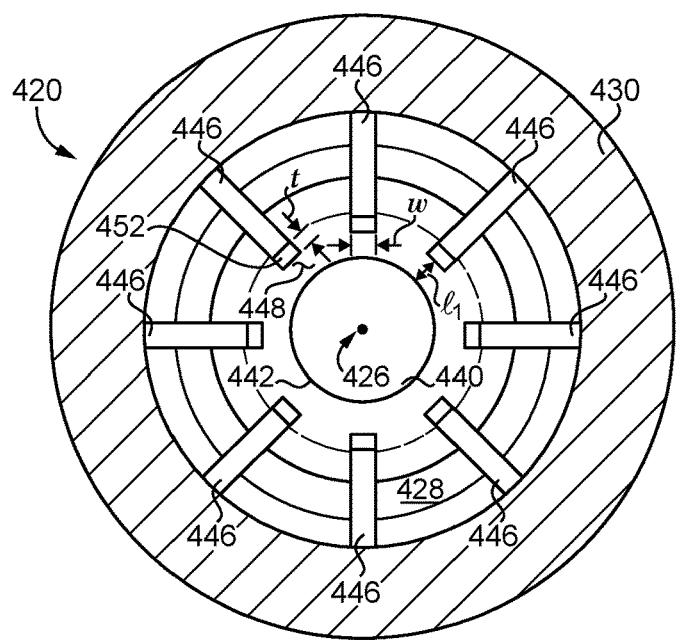
FIG. 8 is another cross-sectional view of the spark plug as in FIG. 7.

Turning now to FIGS. 7 and 8, there are shown views of portions of a spark plug 420 according to one embodiment. The spark plug 420 has similarities to other embodiments described herein and, absent explanation to the contrary, can be understood to function generally analogously to such other embodiments in an ignition system in an internal combustion engine system. For instance, the components shown in FIGS. 7 and 8 are part of a spark plug including a nozzle assembly 424 that could be swapped for some or all of a nozzle assembly as disclosed in connection with other embodiments. Moreover, except where otherwise indicated or apparent from the context description and discussion herein of any feature and/or functionality of any one embodiment can be understood to refer to features and/or functionality of any other embodiment.

The spark plug 420 includes a housing 422 defining a longitudinal axis 426. The housing 422 includes a tip piece 430 forming a pre-combustion chamber or combustion prechamber and one or more openings 434 from the combustion prechamber 428 functionally analogous to openings described elsewhere herein in connection with other embodiments. It will be noted the openings 434 may be angularly oriented relative to the longitudinal axis 426. The spark plug 420 might include a set of angularly oriented openings 434 spaced circumferentially around the longitudinal axis 426 and additionally or alternatively also include a centrally located end opening as depicted in the other embodiments and/or radially oriented openings. The present disclosure contemplates at least one opening, and any number of openings in any suitable arrangement, to fluidly connect a combustion prechamber to a cylinder in an engine.

The spark plug 420 may include a nozzle assembly 424 formed by the tip piece 430, a housing body piece 436, and electrode components to be described, again generally analogous to foregoing embodiments. A spark electrode assembly 438 is located in the housing 422 and includes a first electrode 440 having an electrode surface 442 extending circumferentially around the longitudinal axis 426. The first electrode 440 may include an inner electrode having a base 464 supported in an insulator 468 in some embodiments. The first electrode 440 extends into the prechamber 428 to a terminal electrode tip 462. As illustrated, the first electrode 440 may be centrally located in the spark plug 420 and generally extends axially along the longitudinal axis 426. Embodiments where an inner electrode is offset in a radial direction from a longitudinal axis defined by a spark plug housing would nevertheless fall within the scope of the present disclosure.

The spark electrode assembly 438 further includes a second electrode 444. Second electrode 444 may be electrically connected to the housing 422, such as by direct physical attachment or unattached but direct physical and electrical contact with tip piece 430. The second electrode 444 may be one of a plurality of second electrodes each including an electrode prong 446. The electrode prongs 446 may be spaced circumferentially around the longitudinal axis 426. The electrode prongs 446 may also be understood as spaced circumferentially around the first electrode 440 and the electrode surface 442. The electrode prongs 446 may be substantially identical to one another, and thus description and discussion herein of a second electrode or an electrode prong in the singular will be understood by way of analogy to refer to any of a plurality of second electrodes and/or electrode prongs.

The electrode prong 446 is spaced from the electrode surface 442 to form a spark gap 448 between the first electrode 440 and the second electrode 444. It will be appreciated a plurality of spark gaps are formed between the first electrode 440 and the second electrode 444/electrode prongs 446. In an embodiment, a number of the electrode prongs 446 is 4 or greater. In some implementations, a number of the electrode prongs 446 is 5 or greater, and potentially 6 or greater as in the depiction of FIGS. 7 and 8 where a total of 8 electrode prongs of the second electrode 444 are provided.

It will be appreciated that in the embodiment of FIGS. 7 and 8 the second electrode 444 includes an outer electrode that is radially outward of the first electrode 440. The tip piece 430 includes an inner surface 431 forming the prechamber 428 and extending circumferentially around the longitudinal axis 426 at a location radially outward of the first electrode 440 and the second electrode 444. The inner surface 431 may extend continuously circumferentially around the longitudinal axis 426. The electrode surface 442 may likewise extend continuously circumferentially around the longitudinal axis 426. The electrode prong 446 may also include a radial portion 454 extending radially inward from the tip piece 430 in a direction of the first electrode 440 and generally along a radius of a circle defined by the longitudinal axis 426. The electrode prong 446 may also include an axial portion 456 extending generally along the electrode surface 442 in an axial direction. A bend section 458 of the electrode prong 446 connects between the radial portion 454 and the axial portion 456. The axial portion 456 is radially inward of the radial portion 454 and extends to a terminal end or electrode tip 452. The electrode tip 452 may be spaced an offset distance 460 in an axial direction from the tip 462 of the first electrode 440. Put differently, the first electrode 440 may extend in an axially outward direction along the longitudinal axis 426 a greater distance than does the electrode prong 446.

As noted above, the spark plug 420 has similarities to the other embodiments discussed herein. It will be recalled the central electrode in the embodiments of FIGS. 2-6 includes electrode prongs that form spark gaps together with an electrode surface of an outer electrode member. In the case of the embodiment of FIGS. 7 and 8, the first, inner electrode 440 is surrounded by the electrode prongs 446 of the second, outer electrode 444. The geometry of the electrode prongs 446 may nevertheless be similar or substantially identical in certain respects to that of the electrode prongs of the spark plug 120.

The electrode prong 446 has a thickness t in a radial direction, a width w in a circumferential direction, and is spaced from the electrode surface 442 a gap length $l_1$ of the spark gap 448 in the radial direction. Moreover, t, w, and $l_1$ together define a parameter P having a value from approximately 1.5 to approximately 7.5 according to Equation 1 set forth above. In some implementations, P has a value from approximately 4.5 to approximately 5.5. In other implementations, P has a value from approximately 2.25 to approximately 2.75. The value of P may thus be from approximately 2.25 to approximately 5.5 in some embodiments, and having a value in a range having as a lower limit approximately 2.5 and/or having as an upper limit approximately 5.5. In some implementations w is greater than or equal to t. The electrode prong 446 may have a substantially uniform width and substantially uniform thickness throughout, and typically at least within axial portion 456.

The spark plug 420 can be operated with either of a first polarity or a second polarity. In one implementation the first electrode 440 is a cathode and the second electrode 440 is an anode, with the electrical energy source 112 structured to energize a spark control circuit such that charge flows from the first electrode 440 to the second electrode 440. In other implementations, the electrical energy source 112 is structured to energize a spark control circuit such that charge flows from the electrode prongs 446 of the second electrode 440 to the electrode surface 442 of the first electrode 440 with the first electrode 440 being the anode and the second electrode 440 being the cathode. The latter implementation can be associated with further extended service life as compared to certain known strategies.

According to the present disclosure, and as will be appreciated from the above Equation 1, the electrode prong 446 has a size defined by the thickness t and the width w, and is positioned at the gap length $l_1$ of the spark gap 448 from the electrode surface 442 that is based on a direct exponential relation to t and an inverse exponential relation to w, such that axial wear rates of the electrode surface 442 and the electrode prong 446 are substantially equal. Principles of the equal wear rates as applicable to all embodiments of the present disclosure are further discussed herein.

INDUSTRIAL APPLICABILITY

Referring to the drawings and various embodiments generally, but by exemplary reference to FIGS. 2-6, the spark plug 120 of the present disclosure is particularly applicable within the engine 108 of the power system 100. The engine 108 may be configured to utilize fuel (e.g., CNG, methanol, ethanol, bioethanol, gasoline, and/or the like) to power a generator, propel a movable machine (e.g., a motor vehicle, a railed vehicle, a watercraft, an aircraft), and/or the like. In contrast to spark plugs of the prior art, in which electrodes tend to wear unevenly and thus waste material that might otherwise have been utilized to generate additional sparks, the spark plug 120 of the present disclosure is configured such that the central electrode member 312 wears along the longitudinal axis 218 at a rate that is substantially equal to that of the outer electrode member 222. As a result, the spark plug 120 has an extended service life compared to spark plugs of the prior art, with the central electrode member 312 being configured to shorten by at least 1.5 mm along the longitudinal axis 218 from an initial length to a reduced length. Furthermore, due to the narrower and/or thinner design of the plurality of electrode prongs 316, more space is available within the pre-combustion chamber 350. As a result, the central electrode member 312 may include additional electrode prongs 316 which are thus capable of further extending the service life of the spark plug 120. Because the spark plug 120 has an increased service life relative to other spark plugs, the spark plug 120, when utilized within the power system 100, may conserve material and expenses that would otherwise result from repair and/or replacement of the spark plug 120.

The normalization of the wear rates between a first electrode and a second electrode according to the present disclosure produce a material erosion phenomenon that can be understood as a "wicking" progression of wear. The wicking progression of wear proceeds akin to burning of a candle to displace material from an electrode prong in a predictable and relatively uniform manner that better matches a wear rate of the associated other electrode. As a result, neither electrode outpaces the other and a greater amount of the electrode prong can be consumed before a gap distance becomes too large to be practicably bridged. The present disclosure also reflects the insight that a material area of an electrode prong and a length of separation (the gap length $l_1$) can be optimized to promote the normalization of wear rate between the respective electrodes. Whereas as discussed above earlier spark plug and spark electrode assemblies were often observed to wear away only a relatively small portion of a precious metal electrode prong, of iridium or platinum for example, before the spark plug would fail, according to the present disclosure a majority and in some instances nearly an entirety of an axial portion of an electrode prong can be consumed during service. Also differing from prior art spark plugs and spark electrode assemblies generally, according to the present disclosure the gap length $l_1$ may be established in inverse exponential relation to the electrode prong width w and in direct exponential relation to the electrode prong thickness t as discussed above. Conventional practices commonly establish a larger spark gap length where more electrode material is present, and a shorter spark gap length where less material is present. Thus, the present disclosure also proceeds counter to certain conventional practices in exploiting the discovery that a relatively narrower electrode prong may be advantageously positioned for extended service life relatively further from a second electrode rather than relatively closer.

Making spark plugs according to the present disclosure can include placing a first electrode and a second electrode at a fixed position and orientation relative to one another. In the case of the embodiment of FIGS. 7 and 8, this step could include installing the tip piece 430 in or on the housing piece 436. The first electrode 440 may be supported in insulator 468 which is in turn supported in housing piece 436. The second electrode 446 may be attached to tip piece 430 and secured to housing piece 436 to thus support the first electrode 440 and the second electrode 446 at the fixed position and orientation.

Making a spark plug according to the present disclosure can further include forming, by way of the placing a first electrode and a second electrode, a spark gap between an electrode surface of the first electrode extending circumferentially around a longitudinal axis and an electrode prong of the second electrode. In the case of the embodiment of FIGS. 7 and 8 this step could be part of the final positioning and attachment of the tip piece 430 to the housing piece 436. By way of the forming of a spark gap, a gap length of the spark gap is established that is in inverse relation to a width of the electrode prong, and in direct relation to a thickness of the electrode prong. As discussed above, the inverse relation may be an exponential relation and the direct relation may be an exponential relation. Establishing a gap length may include setting the gap length in direct relation to a parameter P as defined in the above Equation 1 having a value from approximately 1.5 to approximately 7.5. Making a spark plug can also include as part of the steps discussed above, or separately depending on spark plug design, positioning a spark gap of a spark electrode assembly within a combustion prechamber.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, as used herein, the terms "comprises," "comprising," "having," "including," or other variations thereof, are intended to cover non-exclusion, such that a process, method, article, or apparatus that comprises a list of elements does not include only those elements, but may include other elements not expressly listed. In addition, in this disclosure, relative terms, such as, for example, "about," "generally," "substantially," and "approximately" are used to indicate a possible variation of ±10% of the stated value, except where otherwise apparent to one of ordinary skill in the art from the context. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A spark plug comprising:
   a housing defining a longitudinal axis;
   a first electrode having an electrode surface extending circumferentially around the longitudinal axis;
   a second electrode including an electrode prong spaced from the electrode surface to form a spark gap between the first electrode and the second electrode;
   the electrode prong having a thickness (t) in a radial direction, a width (w) in a circumferential direction, and spaced from the electrode surface a gap length ($l_1$) of the spark gap in the radial direction; and
   t, w, and l together define a parameter P having a value according to the equation $$P = \frac{w^2 \sqrt{l}}{t^{2.5}}$$

from approximately 1.5 to approximately 7.5.

2. The spark plug of claim 1 wherein the electrode surface extends continuously circumferentially around the longitudinal axis.

3. The spark plug of claim 1 wherein the housing forms a combustion prechamber, and the spark gap is within the combustion prechamber.

4. The spark plug of claim 3 wherein the electrode prong is one of a plurality of electrode prongs spaced circumferentially around the longitudinal axis.

5. The spark plug of claim 4 wherein the first electrode includes an outer electrode radially outward of the second electrode.

6. The spark plug of claim 4 wherein the first electrode includes an inner electrode radially inward of the second electrode, and the plurality of electrode prongs are spaced circumferentially around the first electrode.

7. The spark plug of claim 6 wherein each of the plurality of electrode prongs includes a radial portion extending radially inward in a direction of the first electrode, and an axial portion extending from a respective one of the radial portions in an axial direction along the first electrode to an electrode tip.

8. The spark plug of claim 1 wherein P has a value from approximately 4.5 to approximately 5.5.

9. The spark plug of claim 1 wherein P has a value from approximately 2.25 to 2.75.

10. A prechamber spark plug comprising:
    a housing having formed therein a combustion prechamber and a flow passage from the combustion prechamber;
    a first electrode;
    a second electrode including a plurality of electrode prongs;
    a plurality of spark gaps defined between the plurality of electrode prongs and the first electrode;
    each of the plurality of electrode prongs having a thickness (t) and a width (w), and being spaced from the first electrode a gap length ($l_1$) at a respective one of the plurality of spark gaps; and
    t, w, and h together define a parameter P according to the equation $$P = \frac{w^2 \sqrt{l}}{t^{2.5}}$$

having a value from approximately 1.5 to approximately 7.5.

11. The spark plug of claim 10 wherein P is in a range having as a lower limit approximately 2.5 or having as an upper limit approximately 5.5.

12. The spark plug of claim 10 wherein w is greater than or equal to t.

13. The spark plug of claim 10 wherein the first electrode includes an outer electrode.

14. The spark plug of claim 13 wherein the housing defines a longitudinal axis, and the second electrode is centered on the longitudinal axis and projects into the combustion prechamber; and each of the plurality of electrode prongs includes a radial portion extending radially outward in a direction of the first electrode, and an axial portion extending from a respective one of the radial portions in an axial direction along the first electrode.

15. The spark plug of claim 10 wherein the first electrode includes an inner electrode, and the plurality of electrode prongs are spaced circumferentially around the first electrode and electrically connected to the housing.

16. The spark plug of claim 15 wherein:

the housing defines a longitudinal axis, and the first electrode is located on the longitudinal axis and projects into the combustion prechamber; and each of the plurality of electrode prongs includes a radial portion extending radially inward from the housing in a direction of the first electrode, and an axial portion extending from a respective one of the radial portions in an axial direction along the first electrode.

17. An ignition system comprising the spark plug of claim 15 and an electrical energy source configured to energize the first electrode as a cathode and the second electrode as an anode.

18. A spark electrode assembly comprising:

a first electrode including an electrode surface extending circumferentially around a longitudinal axis;

a second electrode including an electrode prong supported at a fixed location relative to the electrode surface;

a spark gap is formed between the electrode surface and the electrode prong; and the electrode prong has a size defined by a thickness (t) and a width (w), and is positioned at a gap length ($l_1$) of the spark gap from the electrode surface that is based on a direct exponential relation to t and an inverse exponential relation to w, such that axial wear rates of the electrode surface and the electrode prong are substantially equal.

19. The spark electrode assembly of claim 18 wherein $l_1$ is defined by the direct exponential relation to t, the inverse exponential relation to w, and a direct relation to a parameter P having a value from approximately 1.5 to approximately 7.5.

20. The spark electrode assembly of claim 19 wherein P is in a range having as a lower limit approximately 2.5 or having as an upper limit approximately 5.5.

21. The spark electrode assembly of claim 18 wherein the electrode prong includes a radial portion and an axial portion, and wherein w is greater than or equal to t, and w and t are substantially uniform within the axial portion.

22. The spark electrode assembly of claim 18 wherein the first electrode includes an outer electrode, and the electrode prong is one of a plurality of electrode prongs spaced circumferentially around the longitudinal axis.

23. The spark electrode assembly of claim 20 further comprising a housing, and wherein the first electrode includes a central electrode within the housing, and the electrode prong is one of a plurality of electrode prongs spaced circumferentially around the central electrode and electrically connected to the housing.

24. A method of making a spark plug comprising:

placing a first electrode and a second electrode at a fixed position and orientation relative to one another;

forming, by way of the placing a first electrode and a second electrode, a spark gap between an electrode surface of the first electrode extending circumferentially around a longitudinal axis and an electrode prong of the second electrode; and establishing, by way of the forming a spark gap, a gap length of the spark gap in inverse relation to a width of the electrode prong, and in direct relation to a thickness of the electrode prong.

25. The method of claim 24 wherein the establishing a gap length includes setting the gap length in direct relation to a parameter P having a value from approximately 1.5 to approximately 7.5.

26. The method of claim 25 wherein the establishing a gap length includes establishing the gap length ($l_1$) based on the width (w) of the electrode prong and the thickness (t) of the electrode prong, such that t, w, $l_1$, and P having values according to the equation $$P = \frac{w^2 \sqrt{l}}{t^{2.5}}.$$

27. The method of claim 24 further comprising locating the spark gap within a combustion prechamber in a nozzle assembly;

wherein the electrode prong is one of a plurality of electrode prongs of the second electrode, and the placing the first electrode and the second electrode further includes placing the first electrode radially outward of the second electrode.

* * * * *